Aug. 5, 1958  N. R. BROWNYER  2,846,038
MULTIPLE CLUTCH MECHANISM WITH BLOCKER TEETH
Filed Sept. 23, 1954  5 Sheets-Sheet 3
LOW SPEED
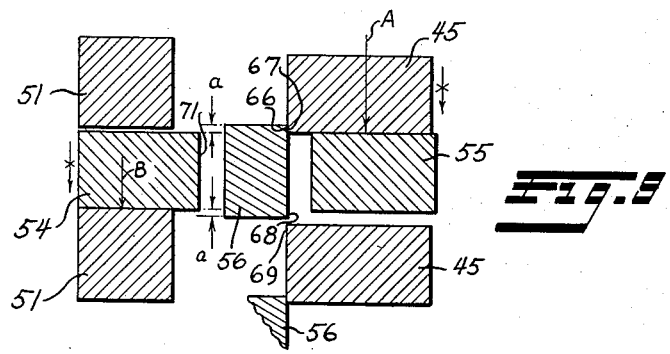
NEUTRAL TRANSITION
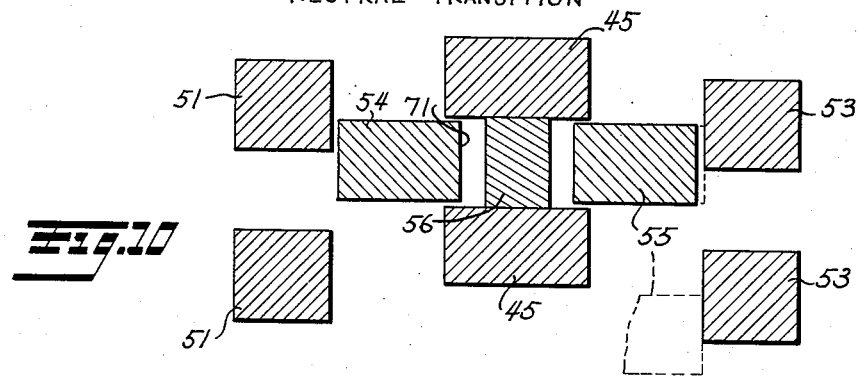
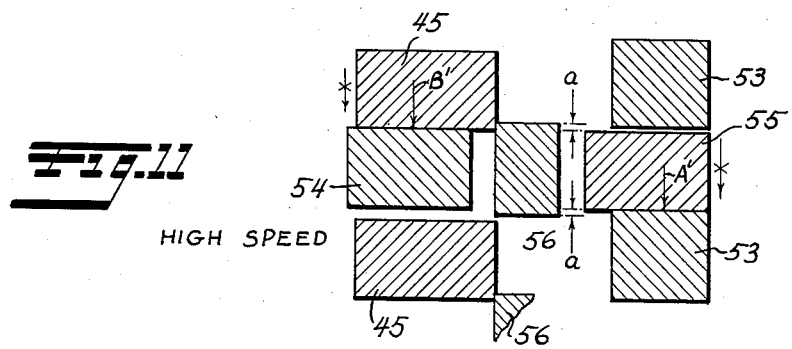
HIGH SPEED
INVENTOR
NELSON R. BROWNYER
BY Strauch, Nolan & Diggins
ATTORNEYS

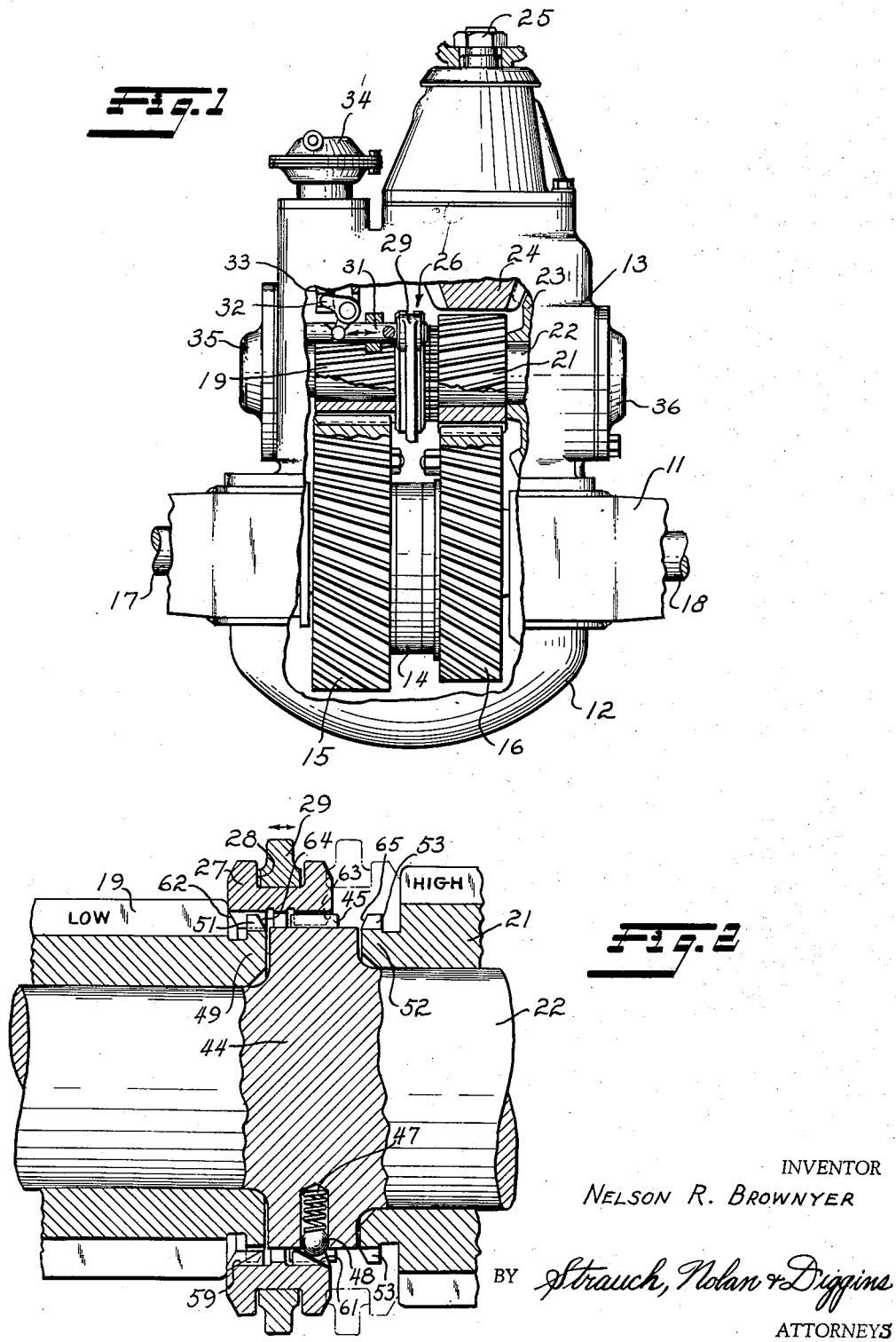

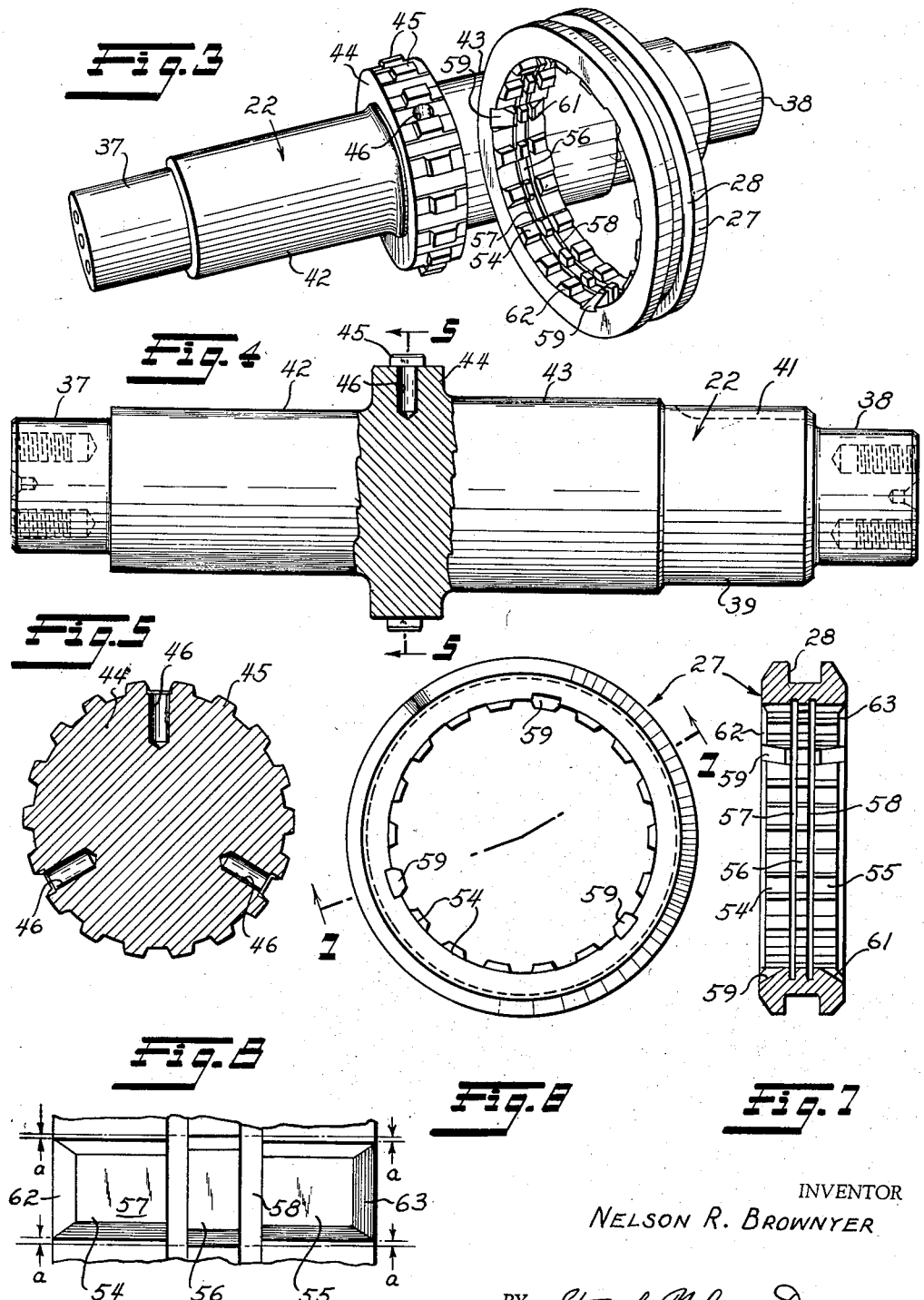

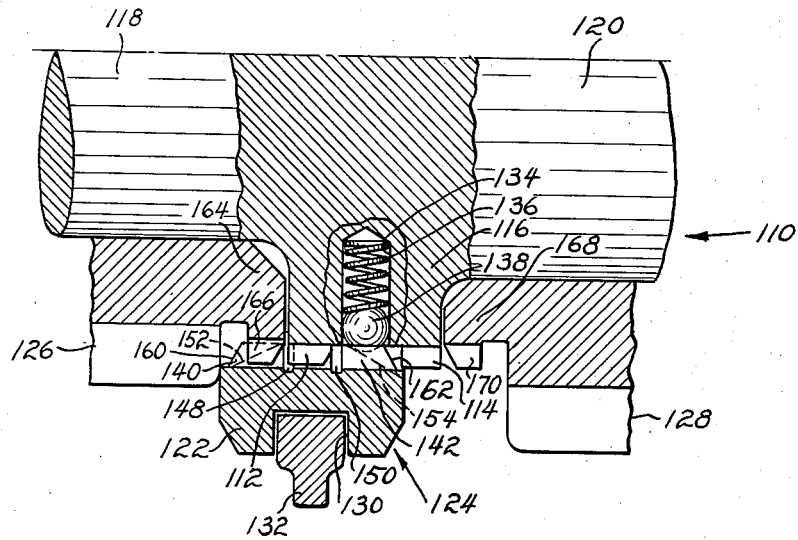
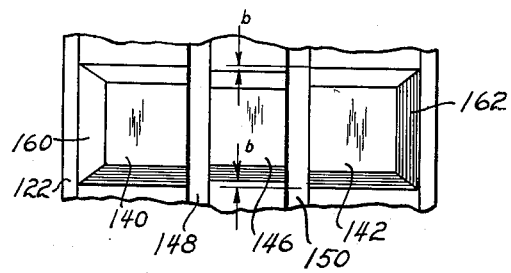

Aug. 5, 1958   N. R. BROWNYER   2,846,038
MULTIPLE CLUTCH MECHANISM WITH BLOCKER TEETH
Filed Sept. 23, 1954   5 Sheets-Sheet 5
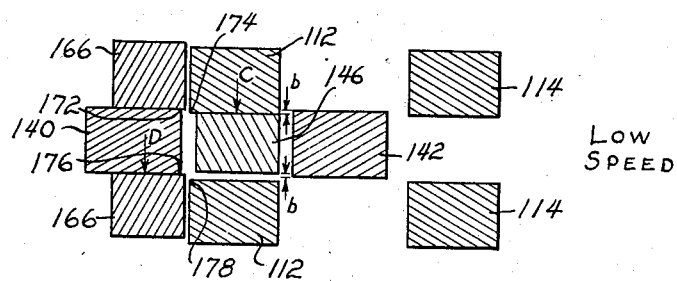
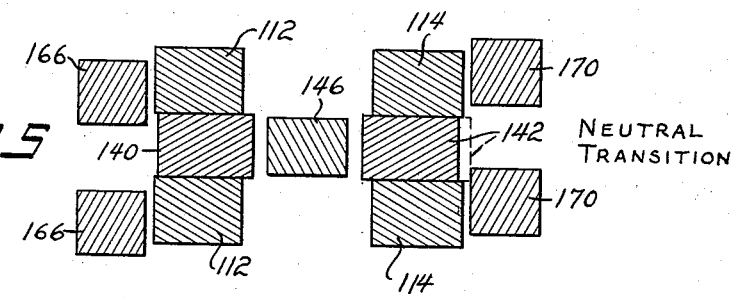
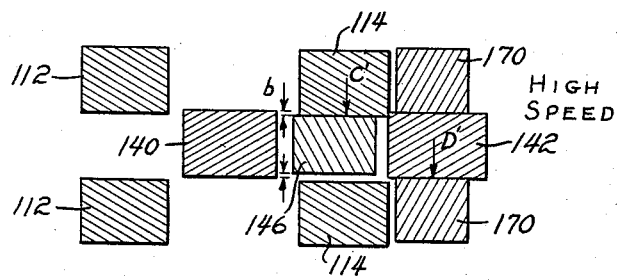
INVENTOR
NELSON R. BROWNYER
BY *Strauch, Nolan & Diggins*
ATTORNEYS

United States Patent Office 2,846,038
Patented Aug. 5, 1958

2,846,038

MULTIPLE CLUTCH MECHANISM WITH BLOCKER TEETH

Nelson R. Brownyer, Detroit, Mich., assignor to Rockwell Spring and Axle Company, Coraopolis, Pa., a corporation of Pennsylvania Application September 23, 1954, Serial No. 457,991

5 Claims. (Cl. 192—48)

This invention relates to clutch mechanisms of the positive type wherein a toothed clutch collar is axially shifted between engagement with two spline toothed clutch members on opposite sides in a torque transmitting drive and is particularly concerned with the maintaining of the clutch collar in selected clutched engagement with either of these clutch members and preventing accidental disengagement during normal operation.

In its preferred embodiment the invention will be described as incorporated in a two speed double reduction heavy duty vehicle axle wherein the clutching mechanism is operable to select the ratio of the drive speed through the axle. Although the invention is particularly desirable for this application, it is to be understood that it may have other uses and the scope of the invention will be defined in the several claims.

Generally similar clutching mechanisms have been employed for changing the speed ratio of the power transmitted through two speed double reduction axles. One such arrangement which is conventionally used in the art is that shown in the United States Letters Patent Reissue No. 23,018, issued to N. R. Brownyer on July 27, 1948, and the present invention represents an improvement in this field.

In one embodiment of the present invention a shiftable clutch collar is provided with the three rows of internal clutch teeth consisting of a center row of locking teeth and, at each end, a row of driving clutch teeth of less chordal thickness. This collar is axially shiftable with respect to a single row of cross shaft teeth and to high and low gear clutch teeth to either high or low speed engaged and locked positions with only the collar end row teeth transmitting torque.

It is therefore a major object of this invention to provide a novel clutch mechanism wherein the clutch collar is provided with two rows of torque transmitting teeth one at each side of the collar and a row of shift locking teeth provided intermediate the torque transmitting teeth.

Examination of prior jaw clutch mechanisms in two speed axle assemblies showed that after some use involving considerable shifting between the high and low speed positions, certain of the tooth corners became rounded from wear and eventually resulted in the teeth assuming a shape wherein they possessed no real shift locking ability. Analysis of such clutch mechanisms showed that this wear is due primarily to impacting of the ends of the teeth during the clutch meshing operation. The problem has been solved in the present invention by providing a row of shift locking teeth which have little or no torque transmitting during normal operation, are not subject to such impact and corner wear and are entirely out of torque transmitting contact when the clutch is fully engaged either in high or low speed.

It is an object of the present invention to provide a novel clutch shift collar having three axially aligned internal rows of clutch teeth, the teeth of the outer two rows being of the same thickness but of different thickness than the teeth of the inner row.

It is a further object of the invention to provide a novel locking clutch shift collar having three axially aligned internal rows of teeth, the teeth of the inner row being thicker than the teeth of the outer two rows which are of the same thickness.

Another object of the invention is to provide a novel locking clutch shift collar having three axially aligned internal rows of teeth, the teeth of the inner row being of less chordal thickness than the teeth of the outer two rows which are of the same thickness.

A further object of the invention is to provide a novel clutch collar which internally has three separate side-by-side rows of axially aligned clutch teeth, the outer rows being identical and the inner row being narrower and having teeth of different chordal thickness than the corresponding teeth of the outer row.

A further object of the invention is to provide a clutching assembly comprising a shaft on which are rotatably mounted spaced gears of different size each formed with a row of clutch teeth and separated by an enlarged shaft shoulder formed with a single row of clutch teeth, and a clutch collar slidably mounted on the shoulder teeth having three internal rows of clutch teeth, the outer rows being adapted for splined engagement with the corresponding clutch teeth of the gears and the inner row functioning substantially only to lock the collar in either clutch engaged position.

Another object of the invention is to provide a clutching assembly comprising a shaft on which are rotatably mounted spaced gears of different size each having a row of clutch teeth and separated by an enlarged shaft shoulder having two spaced parallel rows of axially aligned clutch teeth of the same thickness, and a clutch collar slidably mounted on said shoulder teeth having three internal rows of clutch teeth, the outer rows being adapted for engagement with the corresponding clutch teeth of the respective gears and for tooth inner end locking on the respective shaft teeth outer ends when transmitting torque, to lock the collar in either clutch engaged position.

It is a further object of my invention to provide a novel method of making a positive clutch collar having spaced internal rows of teeth which comprises the steps of forming teeth across the entire internal bore of the collar, cutting spaced annular grooves across the teeth to divide the interior of the collar into three spaced tooth rows and then relieving the sides of the teeth of the outermost two rows until both rows are of the same chordal or pitch line thickness which is less than the chordal thickness of the inner row teeth.

Further objects of the invention will appear as the description proceeds in connection with the appended claims and the annexed drawings wherein:

Figure 1 is a top view of a two speed double reduction axle broken away to show clutching mechanism according to a preferred embodiment of the invention;

Figure 2 is an enlarged fragmentary view mainly in section illustrating the assembly of the clutch collar, the cross shaft and the high and low speed gears in the mechanism of Figure 1;

Figure 3 is an exploded view illustrating the cross shaft and clutch collar of the invention;

Figure 4 is a side elevation partly in section at the intermediate shoulder of the cross shaft;

Figure 5 is a section on line 5—5 of Figure 4 showing the single row of teeth on the shaft shoulder and illustrating the spring and ball detent recesses in the shoulder;

Figure 6 is a side elevation of the clutch collar of Figure 2;

Figure 7 is a section substantially on line 7—7 of Figure 6 showing the three internal rows of teeth in the clutch collar;

Figure 8 is an enlarged diagrammatic view looking at the tops of the teeth to show the central locking teeth as thicker with respect to the outer torque transmitting teeth;

Figures 9, 10 and 11 are diagrammatic views illustrating the relative dimensions and the blocking function of the central row of teeth of the clutch collar during normal operation in a shift between the low speed condition of Figure 9 and the high speed condition of Figure 11;

Figure 12 is an enlarged fragmentary view mainly in section illustrating the assembly of the clutch collar, the cross shaft and the high and low speed gears in another embodiment of the invention;

Figure 13 is an enlarged diagrammatic view looking at the top of the collar teeth to show the central teeth as thinner with respect to the outer teeth; and Figures 14, 15 and 16 are diagrammatic views illustrating the relative dimensions and the blocking function of the inner ends teeth of the outer teeth on the respective cross shaft drive teeth during normal operation in a shift between the low speed condition of Figure 14 to the high speed condition of Figure 16.

Referring to Figure 1, the invention is illustrated as embodied in a two speed drive axle having a housing 11 formed with an enlarged intermediate differential receiving portion 12 and having secured upon its front face a carrier housing 13 which encloses the clutch mechanism of the invention and supports the cross shaft and the pinion shaft as well as the clutch shifting device as will appear.

The axle housing contains a differential cage 14 on opposite sides of which are fixed helical gears 15 and 16 of different sizes. The separate axle shafts 17 and 18 project from opposite sides of the differential assembly to driving connection with the ground engaging wheels in a conventional manner.

Gears 15 and 16 are constantly meshed with gears 19 and 21 respectively which are freely rotatably mounted on a cross shaft 22 that carries at its right hand end in Figure 1 hypoid bevel gear 23 fixed to the cross shaft and in constant mesh with a pinion 24 rigid with the pinion shaft 25 that is journalled in carrier 13 and suitably operably connected to the power source of the vehicle in a conventional manner. Gear pair 19, 15 provides the low speed drive, and gear pair 21, 16 provides the high speed drive.

The clutching mechanism, generally indicated at 26, is mounted on the cross shaft between the gears 19 and 21 for positively clutching either of these gears for rotation with the shaft. The clutch assembly comprises a clutch shift collar 27 which is slidably mounted on the cross shaft as will be explained hereinafter and which is provided exteriorly with an annular groove 28 for receiving a shift fork 29 fixed upon a reciprocably mounted rod 31 connected by a crank 32 with a piston or diaphragm operated rod 33 reciprocated by the pressure responsive element within the fluid pressure motor 34 mounted on the carrier 13.

Referring particularly to Figures 2, 3, 4 and 5, the cross shaft 22 is mounted for rotation at opposite ends in suitable bearings (not shown) closed by bearing caps 35 and 36 secured to the carrier housing. The cross shaft 22 comprises end portions 37 and 38 which are supported in the end bearings, a bevel gear attachment portion having a keyway 41 for mounting the gear 23 non-rotatably with the shaft, and spaced cylindrical portions 42 and 43 for freely rotatably mounting the gears 19 and 21 respectively. These gear journalling portions 42 and 43 are separated by a radially enlarged shoulder formation 44 integral with the rest of the shaft and formed with a centrally disposed row of clutch teeth 45. Spaced around the periphery of shoulder 44 and 120° apart, are three identical bores 46 each extending on the radius of the shaft and each providing a recess for a compression spring 47 backing a detent ball 48, and as will hereinafter be described this arrangement biases the clutch collar into either of its shifted meshed positions.

Referring to Figure 2, the end of gear 19 adjacent shoulder 44 is provided with an axial extension 49 that in the assembly is substantially in sliding abutment with the flat radial side of the shoulder 44 and is formed with an external row of clutch teeth 51. On the other side of shoulder 44, gear 21 is formed with an axial extension 52 substantially in sliding abutment with the other flat side of shoulder 44 and has an external row of clutch teeth 53 which are similar but in opposed relation with respect to clutch teeth 51 at the opposite side of shoulder 44. The gears 19 and 21 are freely rotatably mounted on the cross shaft 22 and are prevented from axial displacement along the cross shaft by abutment with shoulder 44 at their inner ends and at their outer ends gear 23 abutting gear 21 and a suitable spacer collar (not shown) abutting gear 19.

Referring to Figures 2, 3, 6 and 7, the clutch collar 27 is internally formed with three rows of axially aligned teeth, outermost row of teeth 54 and 55 being preferably identical and at least of the same width axially of the collar and of the same chordal thickness and being spaced from the narrower central row of teeth 56 by annular parallel grooves 57 and 58. Three of the teeth 54 and three of the teeth 55 axially aligned therewith which are spaced 120° apart are formed with inclined outer end faces 59 and 61 respectively. As illustrated in Figure 2, the purpose of these inclined tooth end faces at 59 or 61 is to coact with the spring pressed ball 48 for exerting an axial component on the clutch collar 27 for maintaining it in one or the other of the high or low speed clutch engaged positions. Thus when the clutch collar is in the low speed position shown in full lines in Figure 2 the three spring pressed balls 48 coact with surfaces 61 to urge the clutch collar to the left, and when the clutch collar 27 is in the phantom line position shown in Figure 2 the spring pressed balls 48 coact with the inclined faces 59 to urge the clutch collar to the right.

All of the other teeth of row 54 are preferably chamfered at their outer ends to provide upon each a sloping face 62 which is smooth and flat and preferably at an angle of about 30° to the collar axis. Similarly the outer ends of the other row of teeth 55 are chamfered to provide 30° sloping faces 63 which are flat and smooth and oppositely inclined with respect to faces 62. Where the ends of the outer row of the clutch collar teeth are so chamfered the inner ends of the corresponding clutch teeth 51 on gear 19 are chamfered at substantially the same angle to provide on the outer end faces of each of these teeth smooth sloping surfaces 64 which are parallel to surfaces 62 in the assembly. Similarly the teeth 53 on gear 21 are chamfered to provide on their outer ends 30° inclined smooth sloping faces 65 that are parallel to faces 63 in the assembly.

Referring to Figure 8 which shows one axially aligned group of teeth across the interior of collar 27, it will be noted that the width of the inner row teeth 56 measured in the axial direction is less than that of the outer row teeth 54 and 55. Further it will be noted that the teeth of the outer rows 54 and 55 are essentially identical but reversed and have less chordal or pitch line thickness than the inner row teeth 56. As illustrated in Figure 8, three teeth of each row are aligned in the axial direction, and the difference in thickness between the teeth 54 and 56 and between teeth 55 and 56 is represented at each side of the respective teeth by the distance $a$ which is in practice may be about .015 to .020 inch for satisfactory operation.

In the manufacture of collar 27 this construction is readily fabricated using a novel series of steps which produce the new article. The collar 27 is first preferably provided with its inner bore smooth and then the internal teeth of uniform chordal thickness and parallel to the collar axis are cut therein all the way across the bore. Then this single row of internal teeth is formed in a standard tooth cutting or other tooth forming operation which includes chamfering their outer ends. Then the single row of teeth is separated into three rows of teeth 54, 55 and 56 by cutting the grooves 57 and 58 which are undercut below the roots of the teeth. Then, after the grooves 57 and 58 are formed, each of the teeth 54 and 55 is relieved by a machine operation to lessen its chordal thickness by removing from each side metal for the distances indiacted at *a* in Figure 8 so that this makes the outer row teeth 54 and 55 thinner than the central row locking teeth 56. The machining of faces 59 and 61 may be done at any time after the single row of teeth is formed.

Figures 9, 10 and 11 illustrate diagrammatically a cycle of the shift operation starting in the low speed condition and as the collar 27 is shifted from that position towards the high speed position with clearances exaggerated for illustration purposes. Figure 9 shows the parts in the low speed position, corresponding to full lines in Figure 2, and with torque being transmitted, that is with the pinion shaft driving the cross shaft 22 whereby the teeth 45 of the shaft are in torque transmitting contact on one side with the teeth 55 of the clutch collar as indicated by the arrow A in Figure 9, and the clutch collar teeth 54 on the other end of the clutch collar are in torque transmitting contact at one side with the teeth 51 of the low speed ratio gear 19 as indicated by the arrow B in Figure 9.

Under the conditions illustrated in Figure 9, with torque being transmitted as indicated by arrows A and B, there cannot be any shift of the clutch collar 27 out of its low speed condition because its movement to the right in Figure 9 of the clutch collar is blocked positively by abutment of the corners 66 of locking teeth 56 with the corners 67 of teeth 45. Note that teeth 56 are not torque transmitting. Similarly should there be a quick reversal of torque during this condition, as when the operator quickly lets up on the accelerator, which would reverse the direction of the torque arrows A and B in Figure 9, movement of the clutch collar to the right in Figure 9 would be blocked by abutment of the corners 68 of teeth 56 with the corners 69 of teeth 45 before the collar 27 could shift. Thus when there is torque being transmitted in either direction in this low speed condition there can be no shift of the collar 27 out of low speed splined engagement with the gear 19. The overlap of about .015 to .020 inch at these abutting tooth corners has been found most suitable to provide such positive collar locking during transmission of torque, and also swift unlocking response when a shift is called for in a 4½ inch internal diameter shift collar for example.

When the operator desires to shift from the low speed condition of Figure 9 to the high speed condition of Figure 11 he first actuates the fluid pressure responsive motor 34 which thereby produces a fluid powered biasing force tending to shift rod 31 and yoke 29 and consequently collar 27 to the right in Figure 2. This alone cannot effect the shift because the tooth corners 66 and 67 abut and there will be no disengagement from the low speed condition unless they release. The operator releases the accelerator to slow the engine and permit the speed of the teeth 45 to reduce as they will when the torque is removed and as soon as the torque falls to zero or even becomes slightly reversed, teeth 56 will change position circumferentially with respect to teeth 45 and come into axial alignment with the space between the teeth 45. This permits collar 27 to move to the right in Figure 9 through the transitory position shown in Figure 10 under the force of motor 34.

A very quick and sharp torque reversal, instead of permitting the teeth 56 to pass between the tooth corners 67 and 69, may make the teeth 56 jump to abut the tooth corners 68 and 69 thereby relocking the collar against shift movement. Therefore the torque reversal must be reasonably slow in order to insure that the teeth 56 may enter the spaces between the teeth 45. The force which causes the collar 27 to move to the right is of course the biasing force of the motor 34 as applied through the bell crank and the fork to the collar.

It is necessary to prevent shifting of the teeth 56 into the spaces between the teeth 45 unless any torque reversal that may take place is sufficiently slow to insure that the teeth 54 have time to disengage from the teeth 51 of the low speed gear before there is any substantial build-up of torque in the opposite direction. This prevents any substantial torque load on the locking teeth 56 and is an important feature of the invention. The clutch teeth 54 readily enter the spaces between the cross shaft teeth 45 during such a shift because the locking teeth 56 are always in a collar guiding position between the cross shaft teeth 45 at the time when the ends 71 of the teeth 54 enter the spaces between the cross shaft teeth 45, as shown in Figure 10. This result follows because the teeth 56 are thicker than the teeth 54.

In the continuous shift from low to high speed, after disengagement from gear 19 the collar 27 will continue moving to the right in Figure 10 until the teeth 55 assume the position shown in dotted lines in Figure 10 wherein the outermost ends of the teeth slidably abut the ends of the teeth 53 of the high speed gear, the two relatively rotating without engaging, and as soon as the relative rotation of the teeth 55 and 53, there being substantially no torque transmitted through the system at the time, reaches synchronism the teeth 55 slip into the spaces between the teeth 53 and the parts reach the position illustrated in Figure 11. This is quickly done under the power influence of the motor 34 and as illustrated in Figure 11 by the time the teeth 55 are in full engagement with the teeth 53 the locking teeth 56 have cleared and moved out of the spaces between the shaft teeth 45 before there is any substantial build-up of torque and power loading of the teeth 56.

Now referring to Figure 11, assuming that torque is reapplied in the same direction as indicated by the arrows A' and B' the relative thicknesses of the teeth 56 and the torque transmitting teeth 54 reproduces the locked drive condition, and during any condition wherein torque is transmitted in the high speed engagement of the clutch collar with the gear 21 displacement of the collar 27 to the left in Figure 2 (phantom lines) and 11 will be prevented by axial abutment of the corners of the locking teeth 56 with shaft teeth 45 similarly to the low speed condition.

During operation of the vehicle, after the operator has set the shift motor 34 to urge the clutch collar 27 to the right in Figures 2 and 9 he releases the accelerator only long enough so that the torque transmitted between the cross shaft and the gear 19 falls substantially to zero or gives a slight torque reversal. This unlocks the collar 27 permitting the locking teeth to move circumferentially slightly relative to the shaft teeth 45 and thereby enter the space between the shaft teeth 45 under the influence of the shift motor and pass through the transition stage of Figure 10 and eventually upon synchronism into the high speed stage of Figure 11. Synchronism of the teeth 55 and 53 is obtained by the operator's maintaining the accelerator released which means a progressive slowing down of the cross shaft until that synchronism is reached. After the full engagement position of Figure 11 has been reached, the operator then steps on the accelerator again and creates the torque transmitting and clutch collar locked condition illustrated in Figure 11.

When the operator is shifting from high to low starting with the parts in the position of Figure 11, he first releases the accelerator just enough for the torque transmitted between the cross shaft and the teeth 53 to reduce to zero or even provide a very slight torque reversal. This unlocks the collar 27 which moves to the left under the influence of shift motor 34 into rubbing engagement with the teeth 51. Then the operator manipulates the accelerator to increase the cross shaft speed up to the point where the collar speed is synchronized with the speed of the gear 19 and the two go into engagement.

As I have described the operation of continuous shifting from low to high speed and vice versa, it will be understood that the transition position, which is illustrated in Figure 10, is only transitory during these conditions and there, of course, is never any hesitancy of the shift action except when the teeth 55 reach abutment with the teeth 53 prior to synchronism and engagement therewith. Of course during this transitory condition there may be a slight torque between the clutch collar and the shaft but if the accelerator is released there is no substantial or drive torque load on the clutch locking teeth and by the time torque is resumed under the influence of the accelerator, the clutch locking teeth 56 have cleared the space between the shaft teeth 45.

However, with some shifts where it is desired to operate the axle temporarily as a dead axle, it might be desirable to provide the neutral situation shown in full lines in Figure 10 as a definite shift stage and this can be provided by appropriate shift controls stopping the collar 27 in the neutral position during which no torque is transmitted. These controls would be applied to the shift motor linkage.

Since the tooth ends 62 and 63 on the collar are parallel with the respective tooth ends 64 and 65 on the gears 19 and 21, respectively, upon abutment they will simply slidably rotate past each other in rubbing engagement as described in the Brownyer patent. Instead of having these tooth ends chamfered to 30°, as herein described, they may of course be flat smooth faces perpendicular to the axes of rotation as specifically described in said Brownyer patent, but for practical purposes it has been found best to chamfer them as the chamfer gives a self-centering cone action which is useful in engaging the clutch collar with the gear when their speeds are synchronized.

According to another embodiment of the invention shown in Figures 12, 13, 14, 15 and 16 a two speed drive axle similar to that shown in Figures 1 and 2 is provided with a cross shaft 110 having two spaced parallel rows of splined clutch teeth 112 and 114 carried on a radially enlarged shoulder formation 116 which separates the cross shaft 110 into spaced cylindrical portions 118 and 120. An axially shiftable clutch collar 122 is mounted upon the enlarged shoulder formation 116 and has three spaced parallel rows of internally splined clutch teeth as will be explained hereinafter.

The clutching mechanism generally indicated at 124 is mounted on the cross shaft 110 between the gears 126 and 128 which are freely rotatably mounted on end portions 118 and 120 of cross shaft 110 for positively clutching either of these gears for rotation with the shaft. The assembly comprises a clutch shift collar 122 which is axially slidably mounted on the cross shaft 110 and which is provided exteriorly with an annular groove 130 for receiving a shift fork 132 which is fixed upon a reciprocably mounted rod connected by a crank with a piston or diaphragm operated rod reciprocated by the pressure responsive element within the fluid pressure motor mounted on the carrier, as may be seen in Figure 1.

Spaced 120° apart around the periphery of cross shaft shoulder 116 are three identical bores 134 each extending on a radius of the shaft and each providing a recess for a compression spring 136 backing a detent ball 138 which resiliently engages inclined tooth end faces to bias the clutch collar into either of its shifted engaged positions as explained in connection with the preferred embodiment of the invention shown in Figures 1 through 8.

The clutch collar 122 is internally formed with three rows of axially aligned teeth, the outermost rows of teeth 140 and 142 being preferably identical and at least of the same width axially of the collar and of the same chordal thickness and being spaced from the central row of teeth 146 by annular parallel grooves 148 and 150. Three of the teeth 140 and three of the teeth 142 axially aligned therewith which are spaced 120° apart are formed with inclined outer end faces 152 and 154 respectively. The inclined tooth end faces at 152 and 154 coact with the spring pressed ball 138 for exerting an axial component on the clutch collar 122 for maintaining it in one or the other of the high or low speed clutch engaged positions, as in the embodiment of the invention shown in Figures 1 through 8.

All of the other teeth of row 140 are preferably champhered at their outer ends to provide upon each a sloping face 160 which is smooth and flat and preferably at an angle of about 30° to the collar axis. Similarly the outer ends of the other row of teeth 142 are champhered to provide 30° sloping faces 162 which are flat and smooth and oppositely incilned with respect to the faces 160. Gear 126 is provided with an axial extension 164 which is formed with an external row of clutch teeth 166. On the other side of shoulder 116, gear 128 is provided with an axial extension 168 which is formed with an external row of clutch teeth 170. The teeth 166 and 170 on the gears 126 and 128 are champhered to provide on their outer ends 30° inclined smooth sloping faces that are parallel to faces 160 and 162 in the assembly.

Referring to Figure 13 which shows one axially aligned group of teeth across the interior of collar 122, it will be noted that the width of the inner row teeth 146 measured in the axial direction is less than that of the outer row teeth 140 and 142. Further it will be noted that the teeth of the outer rows 140 and 142 are essentially identical but reversed and have greater chordal or pitch line thickness than the inner row teeth 146. As illustrated in Figure 3, three teeth of each row are aligned in the axial direction, and the difference in thickness between the teeth 140 and 142 and between teeth 146 is represented at each of the respective teeth by the distance $b$ which in practice may be about .015 to .020 inch for satisfactory operation.

Figures 14, 15 and 16 illustrate diagrammatically a cycle of the shift operation starting in the low speed condition as the collar 122 is shifted from that position towards the high speed position with clearances exaggerated for illustration purposes. Figure 14 shows the parts in the low speed position with torque being transmitted by cross shaft teeth 112 to center row teeth 146 of the clutch collar as indicated by the arrow C, and by clutch collar end row teeth 140 to teeth 166 of low speed ratio gear 126 as indicated by the arrow D. When torque is transmitted as indicated in Figure 14, there can be no shift of the clutch collar 122 out of its low speed condition because its movement to the right is blocked by abutment of the inner edge corner 172 of teeth 140 with the corners 174 of teeth 112. Should there be a quick reversal of the torque during this condition, as when the operator quickly lets up on the accelerator, which would reverse the direction of the torque arrows C and D in the Figure 14 or when the vehicle is driven in reverse, clutch collar movement to the right is blocked by abutment of inner edge corners 176 of teeth 140 with corners 178 of teeth 112.

When the operator decides to shift from the low speed condition of Figure 14 to the high speed condition of Figure 16, he first actuates the fluid pressure responsive motor 34 of Figure 1 for such a shift and then releases the accelerator to slow the engine until teeth 140 come into alignment with the spaces between teeth 112 as the torque falls to zero or even with a slight torque reversal. This permits collar 122 to move to the right in Figure 14 through the transitory position shown in Figure 15. The outer ends of teeth 142 readily enter the spaces between cross shaft teeth 114 because of the prior entry of teeth 140 into the spaces between teeth 112 when shifting from the low speed condition of Figure 14 to the neutral transition position of Figure 15.

In the continuous shift from high to low speed after disengagement from gear 126 the collar 122 continues moving to the right in Figure 16 until teeth 142 assume the position shown in dotted lines in Figure 15 wherein the outermost ends of the teeth slidably abut the ends of the teeth 170 of the high speed gear 128. This condition of relative rotation without engaging, there being substantially no torque transmitted through the system at the time, continues until relative rotation of the teeth 142 and 170 reaches synchronism and teeth 142 slip into the spaces between the teeth 170 and the clutch members reach the position illustrated in Figure 16. Teeth 146 enter the spaces between teeth 114 with no difficulty because collar end teeth 142 are thicker and by the time teeth 142 clear teeth 114 in the shift to high speed of Figure 16 teeth 146 are substantially in axial position for full engagement.

Referring to Figure 16, with torque applied as indicated by the arrows C' and D' and because teeth 142 are thicker than teeth 146 a lock drive condition in high speed is produced in the same manner as the lock drive condition in low speed. Inner end corners of teeth 142 by abutment with the outermost corners of teeth 114 lock the high speed condition of Figure 16 or any condition wherein torque is transmitted in high speed engagement of the clutch collar with the gear 128. The shifting procedures followed by the operator during operation of the vehicle are the same as described in connection with the embodiment shown in Figures 1 through 8.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In combination, a shaft having intermediate its ends a shoulder, a row of clutch teeth on said shoulder and each of said teeth being circumferentially spaced apart a predetermined distance, gears of different size journalled on said shaft on opposite sides of said shoulder and each of said teeth being circumferentially spaced apart the same distance providing high and low speed drives, a row of clutch teeth on each gear adjacent said shoulder, a clutch shift collar slidably and non-rotatably mounted on said row of teeth on the shaft shoulder and having three parallel rows of axially aligned internal teeth, the teeth of the outer of said rows being of the same chordal thickness, which chordal thickness of said outer rows of teeth being sufficiently less than said circumferential distance between said clutch teeth on the gears as to freely enter the spaces between and operably engage the clutch teeth on one or the other of the gears in opposite limit positions of said collar, and the intermediate row having teeth of greater chordal thickness than the teeth of the outer rows so that when torque is being transmitted through the clutch collar with the clutch collar in either high or low speed positions said collar will be so relatively circumferentially displaced with respect to said clutch teeth on said shoulder that accidental axial displacement of the clutch collar will be prevented by abutment of the teeth of said intermediate row with the ends of the teeth on said shoulder, said intermediate row of teeth on the clutch collar being out of splined engagement meshed with said teeth on the shoulder during torque transmission in either high or low speed positions of the collar but sliding through the spaces between said shaft shoulder teeth to guide the axial movement of said collar during shift between said speeds.

2. In the combination defined in claim 1, said teeth all having substantially sharp rectangular corners at their adjacent ends.

3. In combination, a shaft having intermediate its ends a shoulder, two spaced parallel rows of axially aligned teeth on said shoulder and the teeth of each row being circumferentially spaced apart a predetermined distance, gears of different size journalled on said shaft on opposite sides of said shoulder providing high and low speed drives, a row of clutch teeth on each gear adjacent said shoulder and each of said teeth being circumferentially spaced apart the same distance, a clutch shift collar slidably and non-rotatably mounted on at least one of said rows of teeth on the shaft shoulder and having three parallel rows of internal teeth, the teeth of the outer of said rows being of the same chordal thickness, which chordal thickness of said outer rows of teeth being sufficiently less than said circumferential distance between said clutch teeth on said gears as to enable said outer rows of teeth to enter the spaces between and operably engage the clutch teeth on one or the other of the gears in opposite limit positions of said collar, and the intermediate row having teeth of less chordal thickness than the teeth of the outer rows so that when torque is being transmitted through the clutch collar with the clutch collar in either high or low speed positions said collar will be so relatively circumferentially displaced with respect to said clutch teeth on said shoulder that said intermediate row of teeth is out of torque transmitting engagement with said shaft and accidental axial displacement of the clutch collar will be prevented by abutment of inner end corners of teeth in the respective outer row with outer end corners of teeth in the shaft shoulder row of teeth adjacent the row of gear clutch teeth engaged by said clutch collar.

4. In the combination defined in claim 3, said teeth of said outer rows on said clutch shift collar being of substantially the same axial thickness.

5. In the combination defined in claim 3, all of said clutch teeth having substantially sharp rectangular corners at their adjacent ends.

References Cited in the file of this patent

UNITED STATES PATENTS

| | | |
|---|---|---|
| 2,062,927 | Peterson | Dec. 1, 1936 |
| 2,070,140 | Peterson et al. | Feb. 9, 1937 |
| 2,079,513 | Lapsley | May 4, 1937 |
| 2,174,148 | Vincent | Sept. 26, 1939 |
| 2,521,730 | Keese | Sept. 12, 1950 |
| 2,535,388 | Burks et al. | Dec. 26, 1950 |

FOREIGN PATENTS

| | | |
|---|---|---|
| 615,325 | Great Britain | Jan. 5, 1949 |
| 490,799 | Italy | Feb. 16, 1954 |